(12) United States Patent
Pal (10) Patent No.: US 10,056,723 B2
(45) Date of Patent: Aug. 21, 2018

(54) ELECTRICAL INTERCONNECT ARRANGEMENTS

(71) Applicant: Hamilton Sundstrand Corporation, Charlotte, NC (US)

(72) Inventor: Debabrata Pal, Hoffman Estates, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 17 days.

(21) Appl. No.: 15/135,525

(22) Filed: Apr. 21, 2016

(65) Prior Publication Data

US 2017/0310064 A1 Oct. 26, 2017

(51) Int. Cl.
*H01R 25/00* (2006.01)
*H01R 25/16* (2006.01)
*B64D 47/00* (2006.01)

(52) U.S. Cl.
CPC ........... *H01R 25/162* (2013.01); *B64D 47/00* (2013.01); *B64D 2221/00* (2013.01)

(58) Field of Classification Search
CPC ........................ H01R 25/162; B64D 2221/00
USPC ................................ 439/114, 115, 196, 485
See application file for complete search history.

(56) References Cited

U.S. PATENT DOCUMENTS

| | | | |
|---|---|---|---|
| 3,376,377 A | 4/1968 | Fehr | |
| 3,710,301 A * | 1/1973 | Weimer | H02G 5/08 174/99 B |
| 4,118,639 A * | 10/1978 | Rosey | H02B 1/21 174/99 B |
| 4,121,276 A * | 10/1978 | Kovatch | H02B 1/21 174/71 B |
| 4,213,003 A * | 7/1980 | Carlson | H02G 5/007 174/68.2 |
| 4,627,680 A * | 12/1986 | Weimer | H02G 5/007 174/88 B |
| 5,760,339 A * | 6/1998 | Faulkner | H01R 25/162 174/88 B |
| 5,785,542 A * | 7/1998 | Johnson | H02G 5/007 439/210 |
| 6,510,047 B2 * | 1/2003 | Meiners | H01H 85/47 218/118 |
| 6,934,147 B2 * | 8/2005 | Miller | H02B 1/21 174/68.2 |
| 7,837,496 B1 * | 11/2010 | Pal | H01R 9/2466 361/712 |
| 8,540,526 B2 * | 9/2013 | Mooney | H02G 5/007 174/86 |

(Continued)

FOREIGN PATENT DOCUMENTS

DE   2009 018945   10/2010

OTHER PUBLICATIONS

European Search Report from European Patent Office dated Jun. 14, 2017 for Application No. EP17167307.2.

*Primary Examiner* — Michael A Lyons
*Assistant Examiner* — Milagros Jeancharles
(74) *Attorney, Agent, or Firm* — Locke Lord LLP; Scott D. Wofsy; Christopher J. Cillié

(57) ABSTRACT

An electrical interconnect arrangement for coupling a contactor with a bus bar includes a post, a bus bar connected electrically to the post, and a joint coupling the bus bar to the post. The joint has two or more interfaces defined between the post and the bus bar to reduce resistive heat generation within the electrical interconnect arrangement.

16 Claims, 6 Drawing Sheets

(56) References Cited

U.S. PATENT DOCUMENTS

| | | | |
|---|---|---|---|
| 8,900,002 B2* | 12/2014 | Mooney | H02G 5/007 439/212 |
| 9,437,991 B2 | 9/2016 | Salas Zamarripa et al. | |
| 2015/0111426 A1* | 4/2015 | Buettner | H02G 5/00 439/607.01 |

* cited by examiner

| | Current Flow | Interface Resistance | Interface Joint Loss | Total Joint Loss |
|---|---|---|---|---|
| Single Interface Joint | I | R | $I^2R$ | $I^2R$ |
| Electrical Interface Arrangement 100 | $I_{110A} = I/4$ | R | $I^2R/16$ | $\dfrac{3I^2R}{8}$ |
| | $I_{110B} = I/4$ | R | $I^2R/16$ | |
| | $I_{110C} = I/2$ | R | $I^2R/4$ | |
| Electrical Interface Arrangement 200 | $I_{210A} = I/6$ | R | $I^2R/36$ | $\dfrac{2I^2R}{9}$ |
| | $I_{210B} = I/6$ | R | $I^2R/36$ | |
| | $I_{210C} = I/6$ | R | $I^2R/36$ | |
| | $I_{210D} = I/6$ | R | $I^2R/36$ | |
| | $I_{210E} = I/3$ | R | $I^2R/9$ | |

*Fig. 6*

ELECTRICAL INTERCONNECT ARRANGEMENTS

BACKGROUND OF THE INVENTION

1. Field of the Invention

The present disclosure relates to electrical systems, and more particularly to electrical interconnect arrangements for power distribution systems.

2. Description of Related Art

Electrical power systems such as aircraft power distribution systems commonly include switches that electrically connect power sources, like auxiliary power units and main generators, with loads, like secondary power distribution systems and/or electrical devices. Such switches are generally operable electrically separate the load from the power source when in an off state, and to electrically connect the load to the power source when in an on state. Current flows between the power source and the load in the on state, typically generating heat by resistive heating of current-carrying components connecting the load with the power source.

The heat generated by a current-carrying component generally corresponds with its resistance. With respect to electrical assemblies, heat generation is also influenced by the connections between current carrying components, factors like component misalignment and tolerance stack-ups typically increasing resistance and heating at component connections. In electrical assemblies like power distribution panels, where current-carrying components may have complex shapes due to constrained installation space, the additional resistance at current-carrying component connections can be such that additional cooling is necessary.

Such convention power distribution system arrangements have generally been considered satisfactory for their intended purpose. However, there is still a need in the art for improved power distribution arrangements and interconnects for conductive components in such arrangements. The present disclosure provides a solution for this need.

SUMMARY OF THE INVENTION

An electrical interconnect arrangement for coupling a contactor with a bus bar includes a post, a bus bar connected electrically to the post, and a joint coupling the bus bar to the post. The joint has two or more interfaces defined between the post and the bus bar to limit heat transfer into the post from resistive heating in the joint.

In certain embodiments, the joint can be an interdigitated joint. The bus bar can have a planar body. The planar body can define a longitudinal axis. The post can define a longitudinal axis. The longitudinal axis of the lead post can be angled relative to the longitudinal axis of the bus bar, such as at an oblique or a 90-degree angle. The bus bar can have two or more terminations. The post can have one or more prongs. The two or more terminations of the bus bar can be interleaved with the one or more prongs of the post. The joint can include a fastener. The fastener can couple the terminations of the bus bar with the prongs of the post. Either or both the bus bar and the post can be a single piece of material.

In accordance with certain embodiments, the plurality of terminations can be on an end of the bus bar. The bus bar can have a first termination and a second termination. The first and second terminations can define a gap therebetween. The prong of the post can be seated in the gap defined between the first termination and the second termination of the bus bar. The joint can include a void, the void being bounded by the bus bar and the prong. A first electrically conductive interface can be defined between the prong and the first termination. As second electrically conductive interface can be defined between the prong and the second termination. The prong can be a first prong and the lead post can have a second prong. The second prong can be seated against the second termination on a side of the second termination opposite the gap. A third electrically conductive interface can be defined between the second prong and the second termination. The third conductive interface can be the only electrical path between the second prong of the post and the bus bar.

It is also contemplated that, in accordance with certain embodiments, the bus bar can have a third termination. The third termination can be disposed on a side of the first termination opposite the second termination. The gap between the first termination and the second termination can be a first gap, and the second termination and the third termination can define therebetween a third gap. The post can define an intermediate prong, and the intermediate prong can be seated in the second gap. The intermediate prong can be electrically connected to the bus bar through a first intermediate interface. The intermediate prong can be electrically connected to the bus bar through a second intermediate interface.

A power distribution panel for a power distribution system includes a contactor with a lead, a post with a plurality of prongs electrically connected to the lead, a bus bar with a plurality of terminations electrically connected to the post, and an interdigitated joint coupling the bus bar with the post. The prongs of the post are interleaved with the terminations of the bus bar such that at least three electrically conductive interfaces are defined between the bus bar and the post.

A method of electrically connecting a bus bar to a post includes interleaving two or more terminations of a bus bar with two or more prongs of a lead post and compressing the interleaved terminations and prongs. Compressing the interleaved terminations and prongs can include seating a fastener into a joint between the bus and the post formed by the interleaved terminations and prongs.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
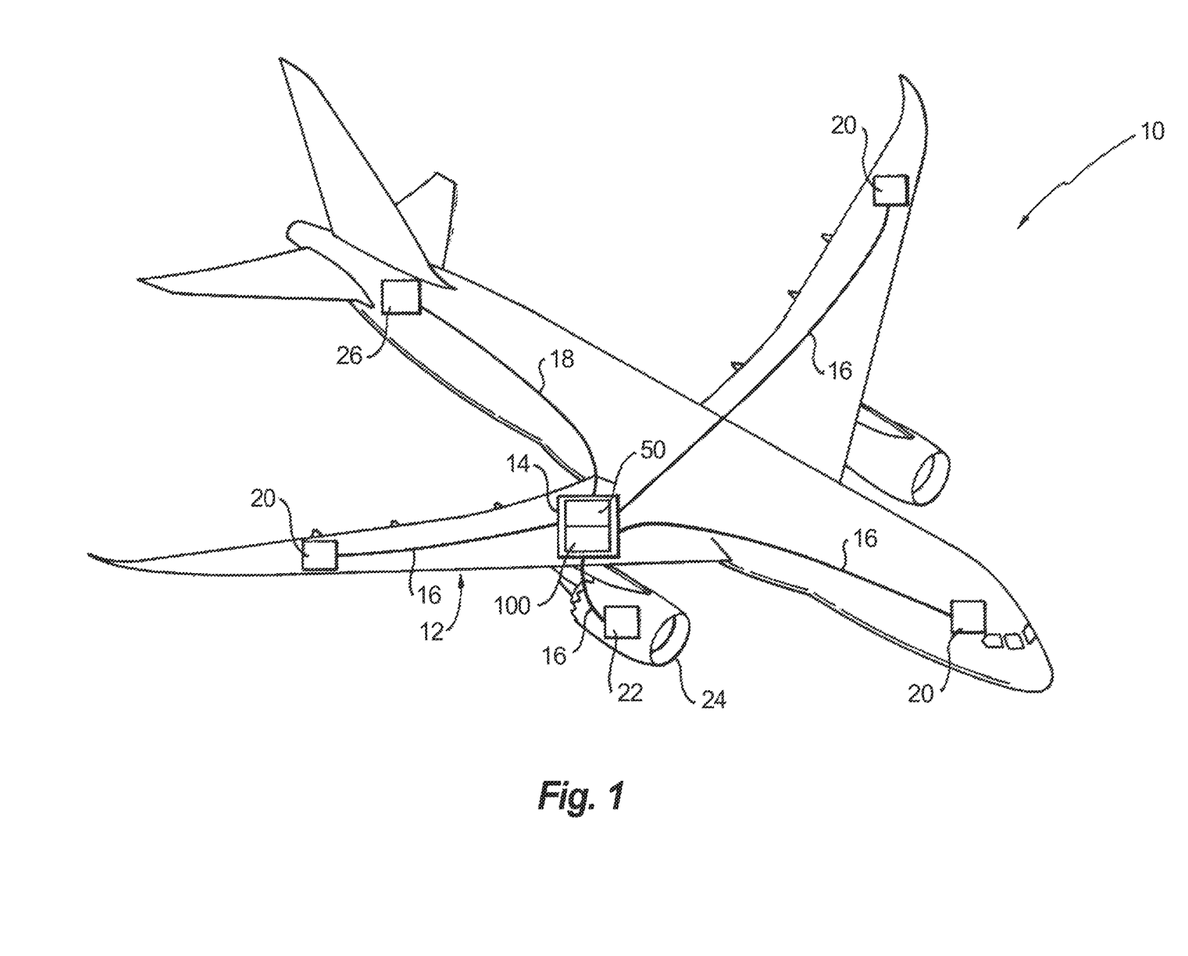
FIG. 1 is a schematic view of an exemplary embodiment of an aircraft electrical system, showing an electrical interconnect arrangement connecting a power source to a power-consuming device through a contactor.

Reference will now be made to the drawings wherein like reference numerals identify similar structural features or aspects of the subject disclosure. For purposes of explanation and illustration, and not limitation, a partial view of an exemplary embodiment of an electrical interconnect arrangement in accordance with the disclosure is shown in FIG. 1 and is designated generally by reference character 100. Other embodiments of electrical interconnect arrangements are provided in FIGS. 2-6, as will be described. The electrical interconnect arrangements can be used to connect contactors and bus bars in primary power panels and/or high-voltage direct current (HVDC) power panels for aircraft electrical systems, though the present disclosure is not limited to power panels or to aircraft electrical systems in general.

With reference to FIG. 1, an aircraft 10 is shown. Aircraft 10 includes a power distribution system 12 with a power distribution panel 14, a primary power bus 16, an HVDC power bus 18, and one or more power-consuming device 20. A main engine 24 is operatively connected to a main generator 22. Main generator 22 is connected to primary power bus 16 and is configured to receive mechanical rotation from main engine 24, convert the rotation into electrical power, and apply the power to primary power bus 16. A direct current power source, such as battery 26, is connected to a HVDC power bus 18 and is configured to apply HVDC power to HVDC power bus 18. One or more of HVDC power bus 18 and primary power bus 16 are connected to a contactor 50 disposed in power distribution panel 14, contactor 50 begin connected to one or more power-consuming device 20 through electrical interconnect arrangement 100.

Figure 2:
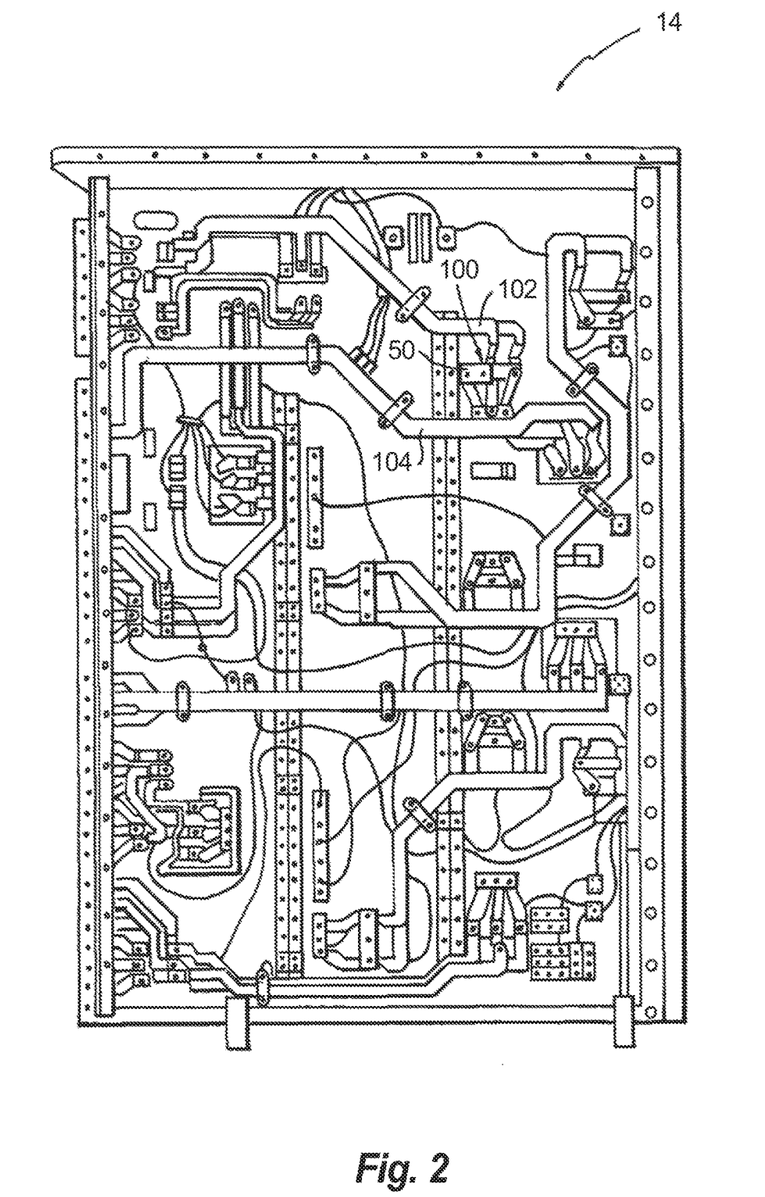
FIG. 2 is a plan view of the power distribution panel of FIG. 1, showing the contactor connected to a bus bar by the electrical interconnect arrangement.

With reference to FIG. 2, power distribution panel 14 is shown. Power distribution panel 14 includes contactor 50, a source bus bar 102, and a supply bus bar 104. Source bus bar 102 is electrically connected to a primary power bus 16 (shown in FIG. 1) (shown in FIG. 1). Supply bus bar 104 is connected to one or more power-consuming device 20 (shown in FIG. 1). Electrical interconnect arrangement 100 connects contactor 50 with source bus bar 102 and provides electrical connectivity between source bus bar 102 and contactor 50. Contactor 50 may include a mechanical or solid-state switch device having an on state and an off state, provides electrical communication between source bus bar 102 and supply bus bar 104 when in the on state, and electrically separates source bus bar 102 and supply bus bar 104 when in the off state. Although described herein as connecting contactor 50 with source bus bar 102, it is to be understood and appreciated that an electrical interconnect arrangement as described herein can also connect contactor 50 with supply bus bar 104. Although illustrated and herein an interconnect arrangement for a primary power bus, it is to be appreciated that interconnect arrangements such as HVDC power bus will also benefit from the present disclosure.

Figure 3:
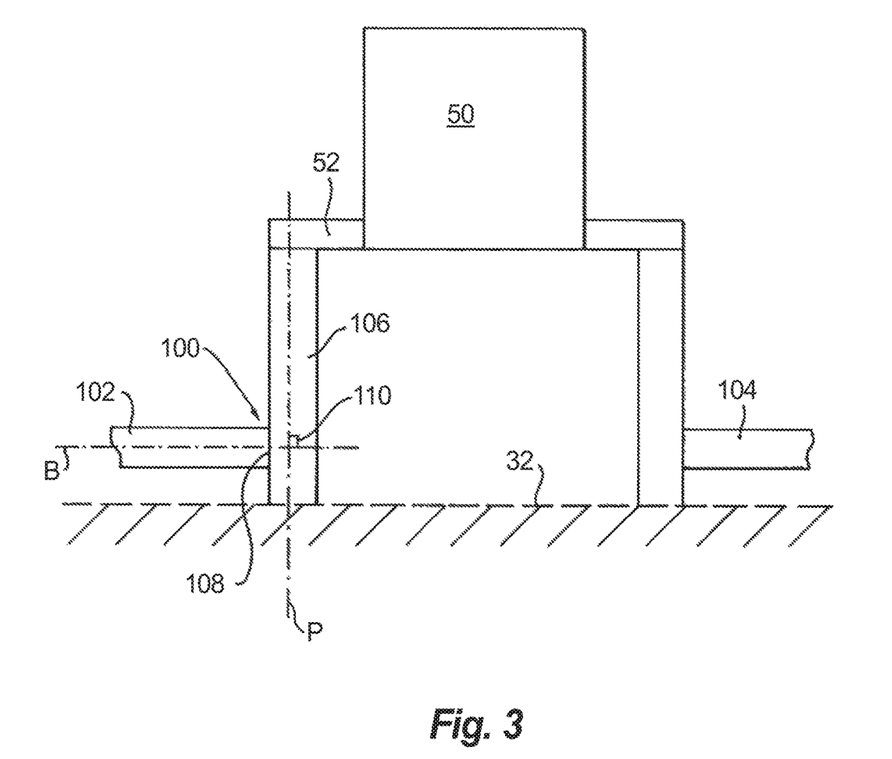
FIG. 3 is a schematic side elevation view of the electrical interconnect arrangement of FIG. 1, showing the electrical interconnect arrangement connecting the bus bar to the contactor.

With reference to FIG. 3, electrical interconnect arrangement 100 is shown. Electrical contactor 50 includes a source lead 52. Source lead 52 is connected to a post 106. Post 106 is connected to source bus bar 102 by a joint 108, may be an interdigitated joint having interleaved connected conductive elements. Either or both of bus bar 102 and post 106 can be a single piece of material fabricated using an additive manufacturing technique. Fabricating either or both of bus bar 102 and post 106 as a single piece of material reduces the number of interfaces within the respective structure, reducing resistance and associated resistive heating of the structure.

Post 106 defines a post axis P and source bus bar 102 defines a bus bar axis B. Bus bar axis B is angled with respect to post axis P and has an angle 110 therebetween that is defined by electrical interconnect arrangement 100. In the illustrated exemplary embodiment angle 110 is about 90-degrees. It is contemplated that angle 110 can be a 180-degree angle or an oblique angle, as suitable for an intended application. Although the exemplary electrical interconnect arrangement 100 is shown connecting contactor 50 with source bus bar 102, it is to be understood and appreciated that a similar interconnect arrangement can connect a supply post with supply bus bar 104. Post 106 structurally supports contactor 50, and may be fixed within power distribution panel 14 (shown in FIG. 2) to an electrically insulative panel element, such as a backplane 32 by way on non-limiting example.

Figure 4A:
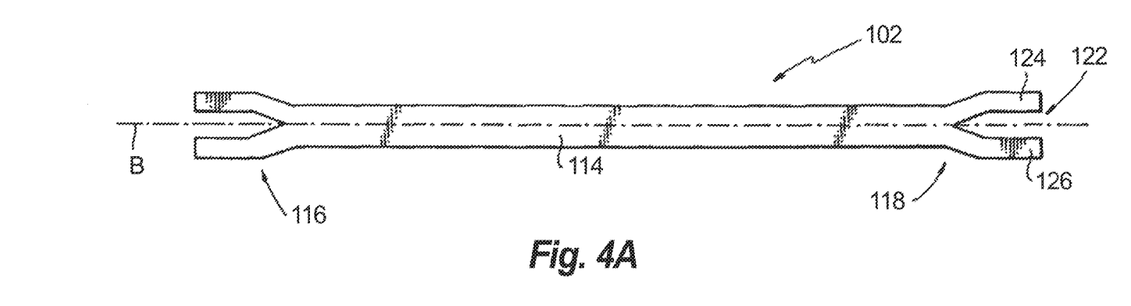
FIGS. 4A and 4B is are side elevation views of the bus bar and electrical interconnect arrangement of FIG. 1, respectively showing the bus bar and an interleaved joint including the bus bar according to a first embodiment.
Figure 4B:
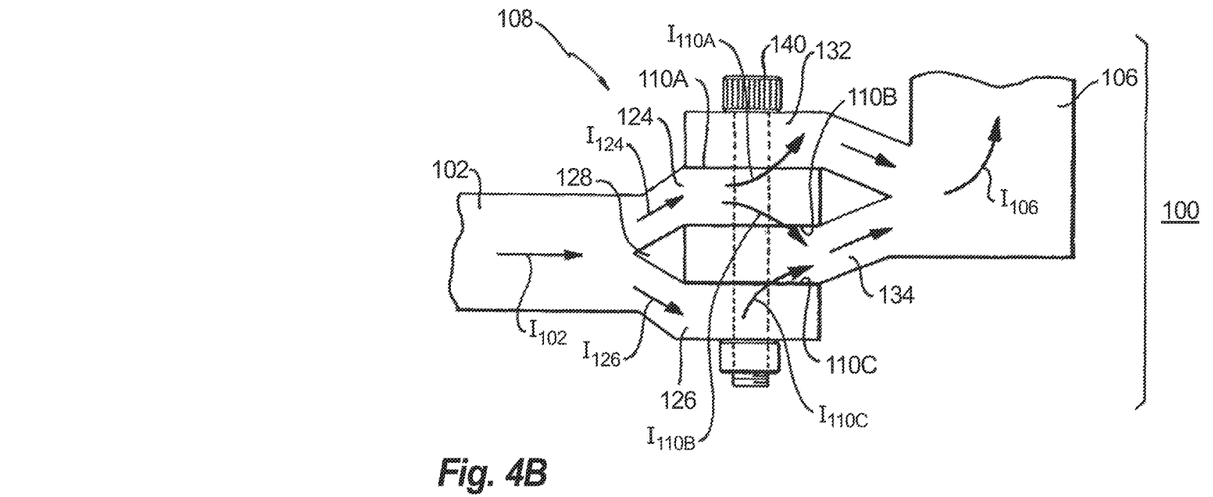

With reference to FIGS. 4A and 4B, electrical interconnect arrangement 100 is shown. Referring to FIG. 4A, source bus bar 102 is shown. Source bus bar 102 has a planar, plate-like body 114 extending between a first end 116 and a second end 118. Plate-like body 114 includes an electrically conductive material such as aluminum, copper, or alloys thereof, and defines a bus bar axis B spanning first end 116 and second end 118. First end 116 of source bus bar 102 has a split end with two or more terminations. In this respect first end 116 has a first termination 124 and a second termination 126 there define between one another a gap 122. Gap 122 is bounded by a surface of first termination 124 that faces a surface of second termination 126, gap 122 being configured and adapted to interleave with a portion of post 106.

Referring to FIG. 4B, joint 108 is shown. Joint 108 includes an interdigitated arraignment of bus bar terminations interleaved with post prongs. In the illustrated exemplary embodiment post 106 has a first prong 132 and a second prong 134, second prong 134 being spaced apart from first prong 132. First prong 132 overlays (relative to the top of FIG. 4A) first termination 124 of source bus bar 102 in joint 108 and is electrically connected with first termination 124 through a first interface 110A. First interface 110 A is defined by a lower surface of first prong 132 and an upper surface of first termination 124.

Second prong 134 is seated within gap 122 between first termination 124 and second termination 126 such that second prong 134 underlays first termination 124 and overlays second termination 126. Second prong 134 is electrically connected with first termination 124 through a second interface 110B defined by an upper surface of second prong 134 and a lower surface of first termination 124. Second prong 134 is also electrically connected to second termination 126 of source bus bar 102 by a third interface 110C defined by a lower surface of second prong 134 and an upper surface of second termination 126. First interface 110A, second interface 110B, and third interface 110C have substantially the same electrical resistance. A fastener 140 is received within joint 108, compressively seating source bus bar 102 against post 106. In the illustrated exemplary embodiment, fastener 140 includes a bolt received within first prong 132, first termination 124, second prong 134, and second termination 126 compressively engaging each of the terminations and prongs with one another. In the illustrated exemplary embodiment joint 106 defines a void 128. Void 128 is bounded by one or termination of source bus bar 102 and prong of post 106, void 128 providing additional area for heat transfer from coolant passively or actively flowing through joint 106.

As will be appreciated by those of skill in the art, current $I_{102}$ entering joint 108 is substantially equivalent to current $I_{106}$ exiting joint 106. As will be appreciated by those of skill in the art in view of the present disclosure, current $I_{102}$ splits in a first termination current flow $I_{124}$ and a second termination current flow $I_{126}$ that are about one-half of current flow $I_{102}$. Current flow $I_{124}$ further divides into a first interface current flow $I_{110A}$, which traverses first interface 110A, and second interface current flow $I_{110B}$, which traverses second interface 110B—each of which are about one-quarter of current flow $I_{202}$. Substantially all of current flow $I_{126}$, i.e. about one-half of current flow $I_{202}$, traverses third interface 110C.

Since each of first interface 110A, second interface 110B, and third interface 110C have substantially equivalent resistance R, joint loss (shown in FIG. 6) is about 0.375 of the joint loss in a joint having a single interface with equivalent resistance. This reduces resistive heat generation in joint 108 in comparison with a single interface joint having the same electrical resistance of the interfaces of joint 108, reducing joint loss by about 62.5%, and commensurately reducing resistive heating on the joint between source bus bar 102 and post 106 in comparison to a single interface joint.

Figure 5A:
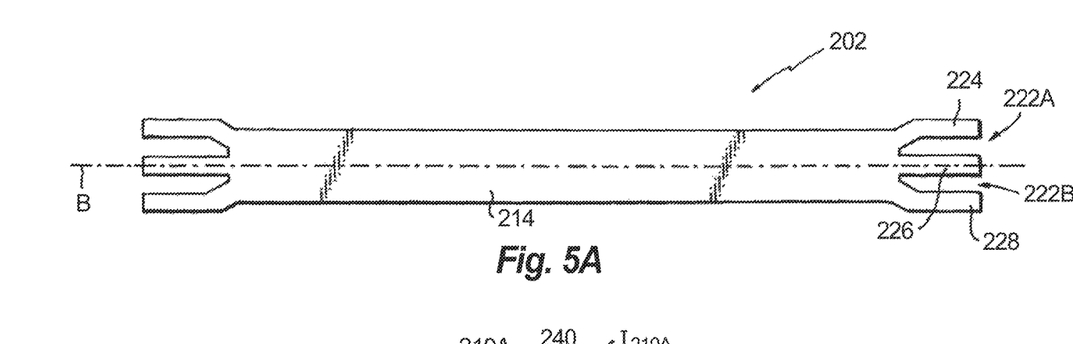
FIGS. 5A and 5B is are side elevation views of another embodiment bus bar and electrical interconnect arrangement, respectively showing a bus bar an interleaved joint according to a second embodiment.
Figure 5B:
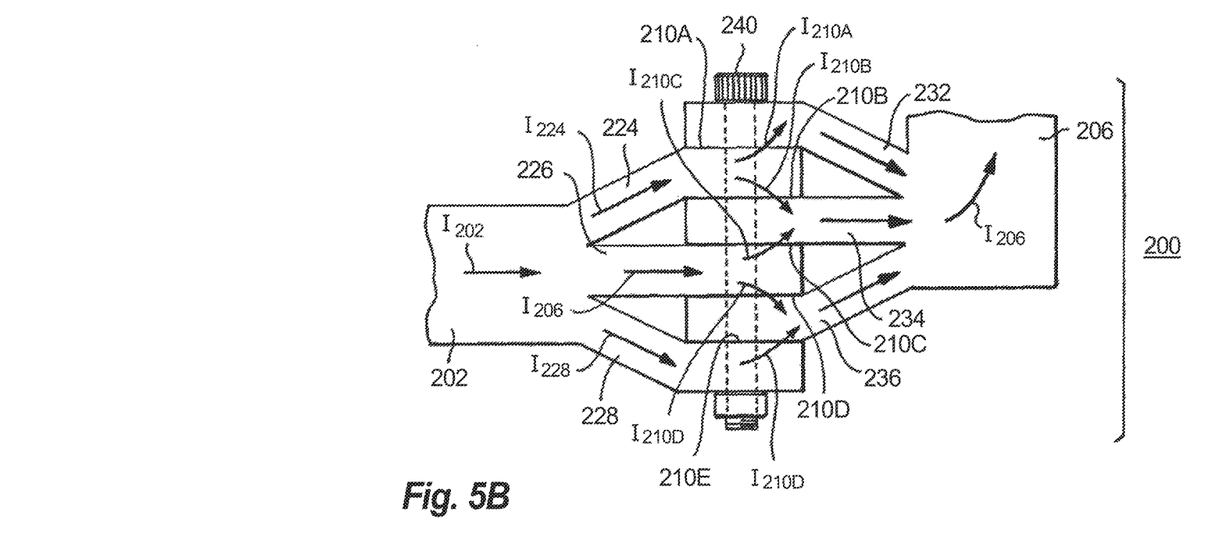

Referring to FIGS. 5A and 5B, an electrical interconnect arrangement 200 is shown. Electrical interconnect arrangement 200 is similar to electrical interconnect arrangement 100 (shown in FIG. 4B), and additionally includes a joint 208. Joint 208 includes three terminations of a source bus bar 202 and three prongs of a post 206, has two addition electrical interfaces defined between source bus bar 202 and post 206, and has still further joint loss that electrical interconnect arrangement 100.

As shown in FIG. 5A, source bus bar 202 is shown. Source bus bar 202 has a plate-like, planar body 214 defining a bus bar axis B and includes a first termination 224, a second termination 226, and a third termination 228. Second termination 226 extends along bus bar axis B. First termination 224 is disposed on a side of bus bar axis B opposite third termination 228, and a gap 222A is defined between first termination 224 and second termination 226. Third termination 228 is disposed on a side of second termination 226 opposite first termination 224, and gap 222B is defined between third termination 228 and second termination 226.

Referring to FIG. 5B, joint 208 is shown. Joint 208 includes first termination 224, second termination 226, and third termination 228. Joint 208 also includes a first pong 232, a second prong 234, and a third prong 236 of post 206. First prong 232 overlays first termination 224 and is connected electrically thereto through a first interface 110A. Second prong 234 underlays first termination 224, is seated within first gap 222A, is electrically connected to first termination 224 through a second interface 210B, and is also electrically connected to second termination 226 through a third interface 210C. Third prong 236 underlays second termination 226, is seated within second gap 222B, is electrically connected to second termination 226 through a fourth interface 210D, and is also electrically connected to third termination 228 through a fifth interface 210E. As with electrical interconnect arrangement 100 (shown in FIG. 4B), each interface has substantially the same electrical resistance. In the illustrated exemplary embodiment, a fastener 240 is received within joint 208, compressively seating the terminations of source bus bar 202 against the prongs of post 206.

Current $I_{202}$ entering joint 208 is substantially equivalent to current $I_{206}$ exiting joint 206. Current $I_{202}$ divides into three current flows as it traverses joint 208, each termination of source bus bar 202 carrying about one-third of current flow $I_{202}$. In this respect first termination 224 carries a first termination current flow $I_{224}$, second termination 226 carries a second termination current flow $I_{226}$, and third termination 228 carries a third termination current flow $I_{226}$.

First termination current flow $I_{224}$ divides into a first interface current flow $I_{210A}$ that is about one-sixth of current flow $I_{202}$, which traverses first interface 210A, and second interface current flow $I_{210B}$, also about one-sixth of current flow $I_{202}$ and which traverses second interface 210B. Similarly, second termination current flow $I_{226}$ divides into a third interface current flow $I_{210C}$ that is about one-sixth of current flow $I_{202}$ and which traverses third interface 210C, and fourth interface current flow $I_{210C}$, which is also about one-sixth of current flow $I_{202}$ and which traverses fourth interface 210D. Third termination current flow $I_{228}$ traverses fifth interface 210E in its entirety.

Since each of the five interfaces of joint 208, i.e. first interface 210A, second interface 210B, third interface 210C, fourth interface 210D, and fifth interface 210E, have substantially equivalent resistance R, joint loss (shown in FIG. 6) is about 0.222 times the joint loss in a joint having a single interface with equivalent resistance. This reduces resistive heat generation in joint 208 in comparison with a single interface joint having the same electrical resistance of the interfaces of joint 108, reducing joint loss by about 77.7%, and commensurately reducing resistive heating on the joint between source bus bar 202 and post 206 in comparison to a single interface joint.

Figure 6:
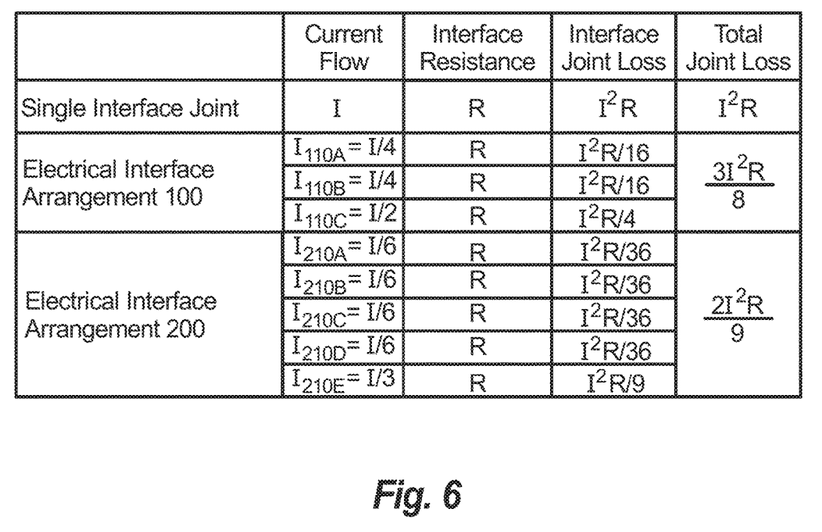
FIG. 6 is joint loss table, showing joint loss for the electrical interconnect arrangements of FIGS. 4A-4B and FIGS. 5A-5B compared to an interconnect having a single interface.

Referring the FIG. 6, a table of joint loss from resistive heating is shown. As will be appreciated by those of skill in the art, 'joint loss' generally describes the tendency of conductive components coupled at a joint to generate heat while an electrical current traverses the joint. The energy loss from joint loss each second, or power, increases with the square of the current flow and in proportion. For single interface interconnect, joint loss for current I across a single interface having resistance R is according to Equation 1.

$$\text{Loss}=I^2 * R \qquad \text{(Equation 1)}$$

Since $I_{110A}$ and $I_{110B}$ are about one-quarter $I1_{02}$, and $I_{110C}$ is about one-half $I_{202}$, joint loss is according to is according to Equation 2 (below); joint loss for second interface 110B is according to Equation 3 (below); and joint loss for the third interface 110C is according to Equation 4 (below).

$$\text{First Interface Loss}=I_{110A}^2 * (R/16) \qquad \text{(Equation 2)}$$

$$\text{Second Interface Loss}=I_{110B}^2 * (R/16) \qquad \text{(Equation 3)}$$

$$\text{Third Interface Loss}=I_{110C}^2 * (R/4) \qquad \text{(Equation 4)}$$

Since total joint loss for electrical interconnect arrangement 100 is the sum of the joint loss across each interface, i.e. across first interface 110A, second interface 110B, and third interface 110C, total joint loss for electrical interconnect arrangement 100 is according to Equation 5, $$\text{Total Loss} = 3 * I_{102}^{2} * (R/8), \qquad \text{(Equation 5)}$$

which is a joint loss reduction of about 62.5% compared to an electrical interconnect having a single interface.

With respect to electrical interconnect arrangement 200 (shown in FIG. 5B) joint loss is further reduced. Since $I_{210A}$, $I_{210B}$, $I_{210C}$, and $I_{210D}$ are about one-quarter $I_{202}$, and $I_{210E}$ is about one-third of $I_{202}$, joint loss in first interface 210A is according to Equation 6 (below); joint loss for the second interface 210B is according to Equation 7 (below); joint loss for the third interface 210C is according to Equation 8 (below); joint loss for the fourth interface 210D is according to Equation 9 (below); and joint loss for the fifth interface 210E is according to Equation 10 (below).

$$\text{First Interface Loss} = I_{210A}^{2} * (R/36) \qquad \text{(Equation 6)}$$

$$\text{Second Interface Loss} = I_{210B}^{2} * (R/36) \qquad \text{(Equation 7)}$$

$$\text{Third Interface Loss} = I_{210C}^{2} * (R/36) \qquad \text{(Equation 8)}$$

$$\text{Fourth Interface Loss} = I_{210D}^{2} * (R/36) \qquad \text{(Equation 9)}$$

$$\text{Fifth Interface Loss} = I_{210E}^{2} * (R/9) \qquad \text{(Equation 10)}$$

Summing the joint losses for the five interfaces, total joint loss for electrical interconnect arrangement 200 is according to Equation 11, $$\text{Total Loss} = 2 * I_{202}^{2} * (R/9), \qquad \text{(Equation 11)}$$

indicating that electrical interconnect arrangement 200 has a joint loss that is about 77.7% of joint loss in an electrical interconnect having a single interface.

A method of electrically connecting a bus bar, e.g., source bus bar 102 (shown in FIG. 4A), to a post, e.g., post 106 (shown in FIG. 4B) includes interleaving two or more terminations, e.g., first termination 124 and second termination 126 (shown in FIG. 4B) of the bus bar with two or more prongs, e.g., first prong 132 and second prong 134 (shown in FIG. 4B) of the lead post and compressing the interleaved terminations and prongs. Compressing the interleaved terminations and prongs can include seating a fastener, e.g., fastener 140 (shown in FIG. 4B), into a joint, e.g., joint 108 (shown in FIG. 4B) between the bus and the post formed by the interleaved terminations and prongs.

In embodiments described herein, bus bars include split ends. The split ends provide parallel terminations on either or both ends of the bus bars. In certain embodiments, the bus bars have two or more terminations on an end that provide reduced joint losses. In accordance with certain embodiments, the split ends provide additional contact area within the joint, thereby enabling improved heat transfer from the joint and into the bus bar.

The methods and systems of the present disclosure, as described above and shown in the drawings, provide for power distribution systems with superior properties including reduced contactor temperatures and/or contactor heat removal capability. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electrical interconnect arrangement, comprising:
  a post, wherein the post is a single piece of material;
  a bus bar electrically connected to the post, wherein the bus bar is a single piece of material; and
  a joint coupling the bus bar to the post, wherein the joint has a plurality of interfaces defined between the post and the bus bar to limit resistive heat generation in the joint,
  wherein the bus bar has first and second terminations, the first termination and the second termination defining a gap therebetween, and
  wherein the post has a prong, wherein the prong is seated in the gap and is bounded by a pair of electrically conductive interfaces.

2. An electrical interconnect arrangement as recited in claim 1, wherein the joint is an interdigitated joint.

3. An electrical interconnect arrangement as recited in claim 1, wherein the joint includes at least three electrically conductive interfaces defined between the post and the bus bar.

4. An electrical interconnect arrangement as recited in claim 1, wherein the joint includes five electrically conductive interfaces defined between the post and the bus bar.

5. An electrical interconnect arrangement as recited in claim 1, wherein the bus bar has a planar body defining a bus bar axis, wherein the post defines a post axis, and wherein the bus bar axis is angled relative the post axis at an oblique or 90-degree angle.

6. An electrical interconnect arrangement as recited in claim 1, wherein the post has a prong, wherein the prong is seated against the first termination and bounded by a single electrically conductive interface.

7. An electrical interconnect arrangement as recited in claim 1, further including a void bounded by the bus bar and the prong.

8. An electrical interconnect arrangement as recited in claim 1, wherein the bus bar has a first termination, a second termination adjacent to the first termination, and a third termination adjacent to the second termination and on a side of the second termination opposite the first termination.

9. An electrical interconnect arrangement as recited in claim 8, wherein the first termination and the second termination define a gap therebetween, wherein the post has a prong seated in the gap and bounded by a pair of electrically conductive interfaces.

10. An electrical interface arrangement as recited in claim 8, wherein the second termination and the third termination define a gap therebetween, wherein the post has a prong seated in the gap and bounded by a pair of electrically conductive interfaces.

11. An electrical interconnect arrangement as recited in claim 8, wherein the post includes a prong, the prong being seated against the first termination and bounded by a single electrically conductive interface.

12. An electrical interconnect arrangement as recited in claim 1, wherein the joint includes a fastener received within the bus bar and the post.

13. An electrical interconnect arrangement as recited in claim 1, wherein the bus bar has a plurality of terminations, wherein the post has a plurality of prongs, and wherein the plurality of terminations are interleaved with the plurality of prongs.

14. An interconnect arrangement for a power distribution panel, comprising:
  a contactor with a lead;
  a post with a plurality of prongs electrically connected to the lead, wherein the post is a single piece of material;

a bus bar with a plurality of terminations electrically connected to the post, a first termination and a second termination defining a gap therebetween, wherein the bus bar is a single piece of material; and an interdigitated joint coupling the bus bar to the post, wherein the plurality of prongs of the post are interleaved with the plurality of terminations of the bus bar, a prong of the plurality of prongs is seated in the gap and bounded by a pair of electrically conductive interfaces such that at least three electrically conductive interfaces are defined between the bus bar and the post.

15. An interconnect arrangement for a power distribution panel as recited in claim 14, wherein the joint includes five electrically conductive interfaces defined between the post and the bus bar, wherein the bus bar has a planar body defining a bus bar axis, wherein the post defines a post axis, and wherein the bus bar axis is angled relative the post axis at an oblique or 90-degree angle. wherein the post is a single piece of material, and wherein the bus bar is a single piece of material.

16. A method of electrically connecting a bus bar to a post, comprising:
   providing a lead post with a prong, the post being a single piece of material;
   providing a bus bar having first and second terminations with a gap therebetween, the bus bar being a single piece of material;
   seating the prong in the gap to define a plurality of electrically conductive interfaces bounding the prong between the post and the bus bar to limit resistive heat generation in the joint;
   interleaving a plurality of terminations of the bus bar with a plurality of prongs of the lead post; and
   compressing the interleaved plurality of terminations and the plurality of prongs.

\* \* \* \* \*